(12) United States Patent
Maitra et al.

(10) Patent No.: US 11,314,534 B2
(45) Date of Patent: Apr. 26, 2022

(54) SYSTEM AND METHOD FOR INTERACTIVELY GUIDING USERS THROUGH A PROCEDURE

(71) Applicant: Accenture Global Solutions Limited, Dublin (IE)

(72) Inventors: Anutosh Maitra, Bangalore (IN); Shubhashis Sengupta, Bangalore (IN); Ajay Chatterjee, Bangalore (IN); Abhisek Mukhopadhyay, Shyamnagar (IN); Shivam Garg, Muzaffarnagar (IN)

(73) Assignee: Accenture Global Solutions Limited, Dublin (IE)

( * ) Notice: Subject to any disclaimer, the term of this patent is extended or adjusted under 35 U.S.C. 154(b) by 331 days.

(21) Appl. No.: 16/777,430

(22) Filed: Jan. 30, 2020

(65) Prior Publication Data

US 2021/0240503 A1 Aug. 5, 2021

(51) Int. Cl.
*G06F 17/00* (2019.01)
*G06F 9/451* (2018.01)
*G06F 40/30* (2020.01)
*G06F 16/9032* (2019.01)
*G06N 3/04* (2006.01)

(52) U.S. Cl.
CPC ........ *G06F 9/453* (2018.02); *G06F 16/90332* (2019.01); *G06F 40/30* (2020.01); *G06N 3/049* (2013.01)

(58) Field of Classification Search
None
See application file for complete search history.

(56) References Cited

U.S. PATENT DOCUMENTS

| | | | | |
|---|---|---|---|---|
| 2018/0322396 | A1* | 11/2018 | Ahuja-Cogny | ........ G06N 5/022 |
| 2019/0206522 | A1* | 7/2019 | Baldwin | ................. G06N 7/005 |
| 2019/0206524 | A1* | 7/2019 | Baldwin | ................. G06N 7/005 |

FOREIGN PATENT DOCUMENTS

WO   WO-2011035389 A1 *  3/2011   ........... G06F 16/313

OTHER PUBLICATIONS

Huang, Z., et al., "Bidirectional LSTM-CRF Models for Sequence Tagging." arXiv:1508.01991v1 [cs.CL] Aug. 9, 2015 (10 pp).
Sang and Déjean, "Introduction to the CoNLL-2001 Shared Task: Clause Identification." In: Proceedings of CoNLL-2001, Toulouse, France, 2001 (5 pp).

(Continued)

*Primary Examiner* — Satwant K Singh
(74) *Attorney, Agent, or Firm* — Plumsea Law Group, LLC

(57) ABSTRACT

An intelligent question and answer (Q&A) system and method for interactively guiding users through a procedure is disclosed. The intelligent Q&A system can dynamically generate process trees (or procedural trees) from the content or procedures presented in a raw document, such as a reference manual. The intelligent Q&A system can include a virtual agent that uses the dynamically generated process trees for interactive conversation with a user. Using the system, the virtual agent can interactively guide users through completing tasks such as updating software or connecting an IoT device to an existing system.

20 Claims, 9 Drawing Sheets

(56) References Cited

OTHER PUBLICATIONS

Duan, N., et al., "Question Generation for Question Answering." In EMNLP. Proceedings of the 2017 Conference on Empirical Methods in Natural Language Processing; pp. 877-885; Copenhagen, Denmark, Sep. 7-11, 2017 (9 pp).
Hu, W., et al., "Aspect-Based Question Generation." ICLR Workshop. 2018 (10 pp).
Wang, Z., et al., "QG-net: A Data-Driven Question Generation Model for Educational Content." ACM Conference on Learning at Scale. L@S 2018, Jun. 26-28, 2018, London, United Kingdom (10 pp).

* cited by examiner

SYSTEM AND METHOD FOR INTERACTIVELY GUIDING USERS THROUGH A PROCEDURE

TECHNICAL FIELD

The present disclosure generally relates to intelligent virtual agents, and in particular to intelligent virtual agents that can ask and answer questions.

BACKGROUND

Virtual agents are artificially intelligent agents that can interact with users. Goal- or task-oriented virtual agents may communicate with human users in a natural language and work with or help the users in performing various tasks. The tasks performed by a virtual agent can vary in type and complexity. Exemplary tasks include information retrieval and rule-based recommendations. Informally, virtual agents may be referred to as "chatbots." Virtual agents may be used by corporations to assist customers with tasks such as booking reservations. Using virtual agents may offer a corporation advantages by reducing operational costs of running call centers and improving the flexibility with which a company can increase the number of available agents that can assist customers.

Existing virtual agents lack the ability to guide users through complex tasks in a way that is informed by the user's context. Building virtual agents that have this context is challenging, since the context is highly domain specific and may even depend on the types of users and/or clients that are being serviced. Existing virtual agents may require context information to be provided in a well-known structure or format. However, many organizations developing the content that provides both the context information and explicit instructions for performing a particular task may choose a presentation format that is best suited to their employees and clientele, rather than virtual agents.

There is a need in the art for a system and method that addresses, at least, the shortcomings discussed above.

SUMMARY

An intelligent question and answer (Q&A) system and method for interactively guiding users through a procedure is disclosed. The Q&A system and method solves the problems discussed above by automatically retrieving instructions and context information from a variety of document formats and using this information to build process trees that can be used by a virtual agent to guide a user through a procedure. Specifically, the Q&A system can automatically identify and extract procedural text from reference manuals and other documents and convert the procedural text into a process tree that can be traversed by the virtual agent. To convert the procedural text into a process tree, the Q&A system can identify decision points in the procedural text, identifying clauses associated with the decision points, and automatically generating questions using the identified clauses. By pre-processing the document text into procedural and non-procedural portions, the exemplary system and method may reduce the amount of text that needs to be analyzed downstream by components identifying decision points and components separating the text into clauses, thereby improving computational efficiency.

The Q&A system may use multiple machine learning models to extract and convert procedural text into a process tree. The Q&A system can use a long-short term memory neural network (LSTM) to classify text as procedural or non-procedural. The Q&A system can separate procedural text into independent and dependent clauses using a combination of an LSTM and two separate natural language processing (NLP) parsers. By using an LSTM in combination with two text parsers, the Q&A has improved accuracy in distinguishing between independent and dependent clauses compared to systems that may rely on only a neural network or a single parser to identify clauses. The Q&A system can also use a recurrent neural network to generate questions from independent clauses. Using a recurrent neural network to generate questions provides a data driven model that can be trained to perform with improved accuracy over systems that use question pattern mining or pattern based question generation techniques.

In one aspect, a method of dynamically generating process trees and using the dynamically generated process trees to converse with a user, where conversing with the user is accomplished by an artificially intelligent virtual agent, includes steps of (1) retrieving a document including text; (2) automatically extracting, using a procedure classification model, a section of text in the document corresponding to a procedure; (3) automatically identifying one or more decision points associated with the section of text; (4) automatically identifying, using a clause identification model, a set of clauses associated with the one or more decision points, where each clause in the set of clauses comprises sequences of words from the section of text; (5) automatically generating, using a question generation model, at least one question from the set of clauses; (6) automatically generating a process tree from the at least one question and the set of clauses; (7) retrieving, using the virtual agent, the process tree; and (8) conversing, using the virtual agent, with the user, where conversing with the user includes traversing through at least one path in the process tree. The process tree generated by the method includes one or more decision nodes corresponding to the at least one question, one or more response nodes, and one or more paths connecting the one or more decision nodes and the one or more response nodes.

In another aspect, a system for dynamically generating process trees and using the dynamically generated process trees to converse with a user includes a device processor; and a non-transitory computer readable medium storing instructions. The instructions are executable by the device processor to implement a process tree generator that generates process trees. The process tree generator further includes a procedure classification model that classifies sections of text as procedural text or non-procedural text, a decision points identifier that identifies decision points in procedural text, a clause identification model that uses information about decision points in procedural text to identify independent and dependent clauses in the procedural text, a question generation model that generates questions corresponding to independent clauses identified by the clause identification model, and an answer path analyzer that constructs paths between questions generated by the question generation model and dependent clauses identified by the clause identification model. The instructions are also executable to implement a virtual agent that retrieves process trees generated by the process tree generator and uses the process trees to converse with users.

In another aspect, a non-transitory computer-readable medium storing software comprising instructions executable by one or more computers is provided. Upon such execution, the instructions cause the one or more computers to retrieve a document including text, automatically extract a section of text in the document corresponding to a procedure, automatically identify one or more decision points associated with the section of text, and automatically identify a set of clauses associated with the one or more decision points, where each clause in the set of clauses comprise sequences of words from the section of text. The instructions also cause the one or more computers to automatically generate at least one question from the set of clauses and automatically generate a process tree from the at least one question and the set of clauses.

Other systems, methods, features, and advantages of the disclosure will be, or will become, apparent to one of ordinary skill in the art upon examination of the following figures and detailed description. It is intended that all such additional systems, methods, features, and advantages be included within this description and this summary, be within the scope of the disclosure, and be protected by the following claims.

While various embodiments are described, the description is intended to be exemplary, rather than limiting and it will be apparent to those of ordinary skill in the art that many more embodiments and implementations are possible that are within the scope of the embodiments. Although many possible combinations of features are shown in the accompanying figures and discussed in this detailed description, many other combinations of the disclosed features are possible. Any feature or element of any embodiment may be used in combination with or substituted for any other feature or element in any other embodiment unless specifically restricted.

This disclosure includes and contemplates combinations with features and elements known to the average artisan in the art. The embodiments, features and elements that have been disclosed may also be combined with any conventional features or elements to form a distinct invention as defined by the claims. Any feature or element of any embodiment may also be combined with features or elements from other inventions to form another distinct invention as defined by the claims. Therefore, it will be understood that any of the features shown and/or discussed in the present disclosure may be implemented singularly or in any suitable combination. Accordingly, the embodiments are not to be restricted except in light of the attached claims and their equivalents. Also, various modifications and changes may be made within the scope of the attached claims.

BRIEF DESCRIPTION OF THE DRAWINGS

The invention can be better understood with reference to the following drawings and description. The components in the figures are not necessarily to scale, emphasis instead being placed upon illustrating the principles of the invention. Moreover, in the figures, like reference numerals designate corresponding parts throughout the different views.

DESCRIPTION OF EMBODIMENTS

An intelligent question and answer (Q&A) system and method for interactively guiding users through a procedure is disclosed. The intelligent Q&A system can dynamically generate process trees (or procedural trees) from written procedures (for example, instructions) presented in a raw document, such as a reference manual. The intelligent Q&A system can include a virtual agent that uses the dynamically generated process trees for interactive conversation with a user. In this way, the virtual agent can help a user focus on a single procedural step at a time without being overwhelmed by tracking steps in a written procedure (for example, instructions) while simultaneously performing the procedural steps. Tracking steps can be particularly difficult for a user if instructions contain many complicated steps or if instructions contain additional text beyond the steps. The virtual agent can identify steps within the instructions and can track the steps for the user. Also, the virtual agent can identify points where the procedure splits into different paths and can help a user select a path and continue feeding the user steps one at a time.

The embodiments provide a system and method for guiding users through various kinds of procedural tasks. As used herein, procedural tasks, or simply procedures, include any sequential set of coherent instructions aiming to achieve a goal. A procedural task may comprise various alternative paths to achieve the same task. Examples of procedural tasks can include setting up an account for an online service or setting up a new device such as a computer, tablet, phone, or wearable device. Additional examples may include the process of applying for a loan or initiating an online bill pay event. It may be appreciated that this list is not exhaustive and any task that can be accomplished by following a suitable set of instructions may be considered a procedural task.

Figure 1:
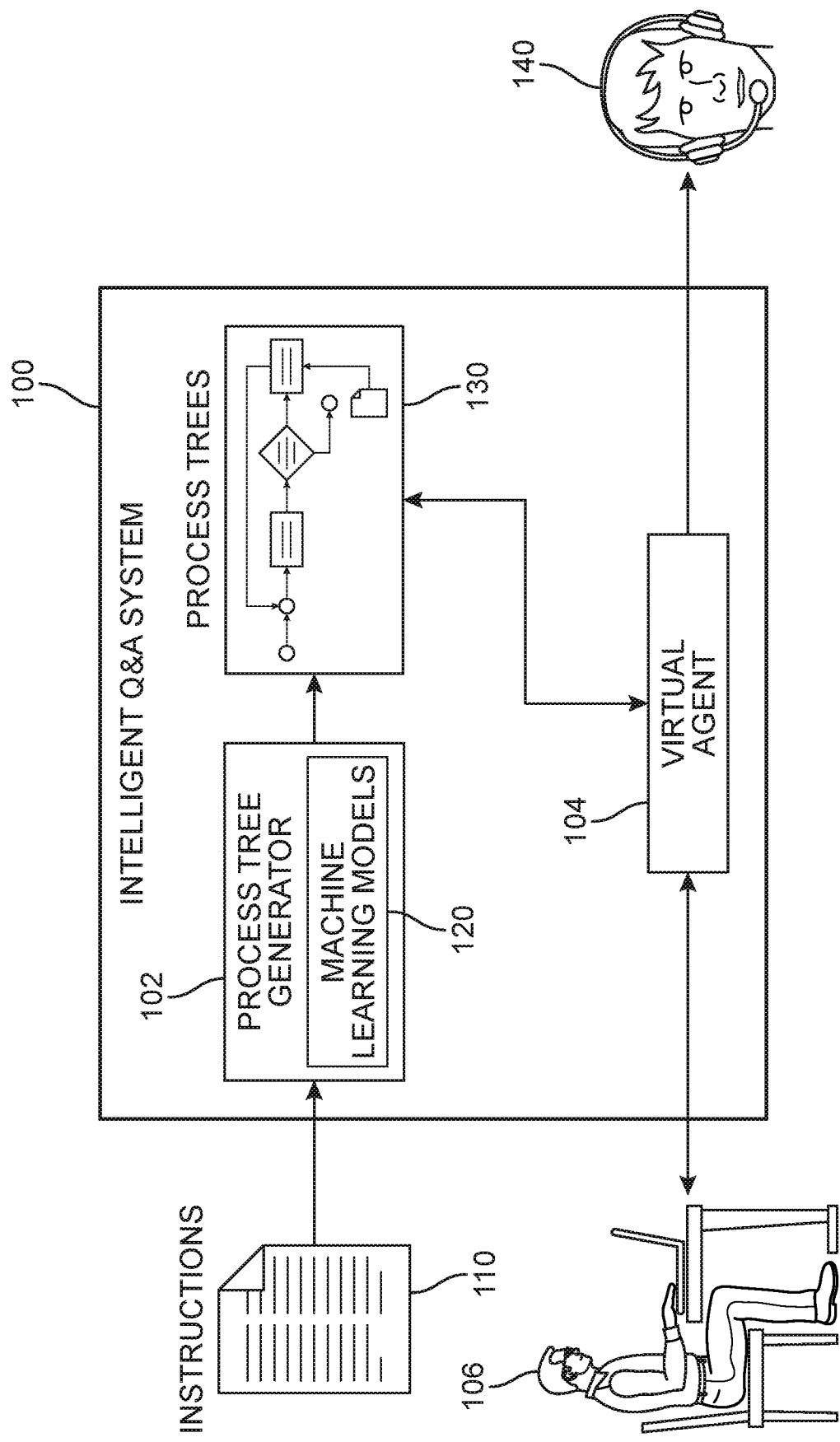
FIG. 1 is a schematic view of an intelligent question and answer system, according to an embodiment.

FIG. 1 is a schematic view of an intelligent question and answering (Q&A) system 100, which may also be referred to hereafter as Q&A system 100. Q&A system 100 may include intelligent virtual agent 104 (or simply virtual agent 104). Intelligent virtual agent 104 may be a virtual representative, or chatbot, that is capable of communicating with a user 106. Specifically, virtual agent may be a conversational artificial intelligence (AI). Virtual agent 104 may communicate with user 106 through text, voice, or any other suitable medium.

In some embodiments, a virtual agent may be capable of interactively guiding a user through a procedure, task, or a set of related questions. To facilitate this interactive guidance, the virtual agent may have access to procedural or process information that helps the virtual agent guide the user through a sequence of steps. In some embodiments, this procedural or process information is stored in the form of process trees. As used herein, the term "process tree" refers to a representation of a sequence of steps as well as one or more pathways through the sequence of steps. In some cases, a process tree may be represented diagrammatically as a flow-chart.

As seen in FIG. 1, Q&A system 100 includes a process tree generator 102 (or, simply, generator 102). Generator 102 receives information related to a process, or procedure, and converts at least some of this information into one or more process trees. For example, generator 102 may receive a set of instructions 110 as input. The instructions could be related to performing a particular task, answering a set of interdependent questions, or otherwise related to a complex action that requires multiple steps. As described in further detail below, generator 102 uses a set of machine learning models 120 to convert the instructions 110 into one or more process trees 130.

Once produced, the process trees 130 may be retrieved by virtual agent 104. Then, virtual agent 104 can interactively guide user 106 through a procedure, task, action, or related set of questions, by traversing a path through the appropriate process tree. For example, virtual agent 104 may ask user 106 questions corresponding to decision points in a process tree, and then follow a particular path through the process tree according to the answers provided by the user. As one example, a process tree for helping a user update software on their computer could include a decision point that asks the user "do you have a Linux operating system?", to which the user could answer "yes" or "no". Depending on the answer to this question, the virtual agent would traverse a different path through the process tree.

It may be appreciated that process tree generator 102 could receive any suitable form of input. Examples of possible input includes, but is not limited to: various reference documents, instruction manuals, and FAQs. Documents could be received in any suitable format that includes text.

Some embodiments can include provisions whereby a virtual agent is able to hand off communication with a user to a human agent 140. For example, if user 106 asks a question that virtual agent 104 cannot answer (or understand), then virtual agent 104 may transfer user 106 to human agent 140 with the necessary expertise to guide a user through some task or answer questions. Likewise, if user 106 provides a response to virtual agent 104 that is unanticipated, virtual agent 104 may transfer user 106 to human agent 140. This ensures that users do not get stuck trying to get an answer or other guidance from a virtual agent when the virtual agent has no way of providing the necessary answer.

Figure 2:
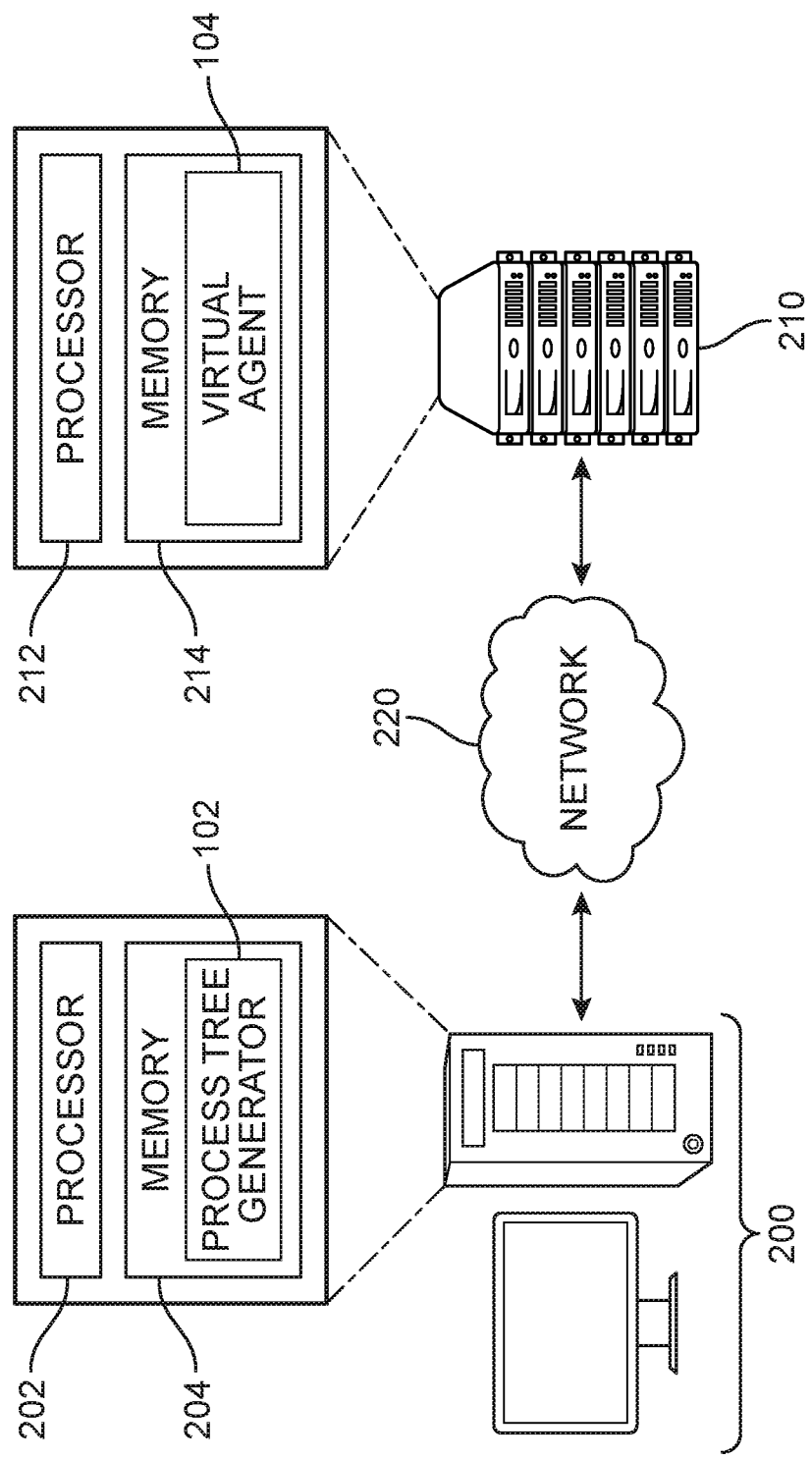
FIG. 2 is a schematic view of computing systems that may be used to run components of the question and answer system, according to an embodiment.

As shown in the embodiment of FIG. 2, a system for performing some, or all, of the steps described in the embodiments can include one or more computing systems and/or networks. In the embodiment of FIG. 2, process tree generator 102 and virtual agent 104 may each be associated with a computing system. In other embodiments, both process tree generator 102 and virtual agent 104 could be hosted on a single computing system.

Process tree generator 102 may be hosted on a computing system 200. Computing system 200 may include at least one processor 202 and memory 204 for storing information, including software information and/or data. Processor 202 may include a single device processor located on a single device, or it may include multiple device processors located on one or more physical devices. Memory 204 may include any type of storage, which may be physically located on one physical device, or on multiple physical devices.

Virtual agent 104 may be hosted on computing system 210. Computing system 210 may include at least one processor 212 and memory 214 for storing information, including software information and/or data. Processor 212 may include a single device processor located on a single device, or it may include multiple device processors located on one or more physical devices. Memory 214 may include any type of storage, which may be physically located on one physical device, or on multiple physical devices. In some cases, computing system 210 may comprise one or more servers that are used to host virtual agent 104 so that a user can communicate directly with virtual agent 104.

Computing system 200 and computing system 210 may communicate with one another and/or other systems over network 220. For example, computing system 210 may retrieve process trees from computing system 200 via network 220. In some embodiments, network 220 may be a wide area network ("WAN"), e.g., the Internet. In other embodiments, network 220 may be a local area network ("LAN").

Although not shown in FIG. 2, in some cases, computing system 200 and computing system 210 could both have access to a database. In such cases, process trees generated at computing system 200 could be saved to the database. Virtual agent 104 could then retrieve the process trees by accessing the shared database.

Figure 3:
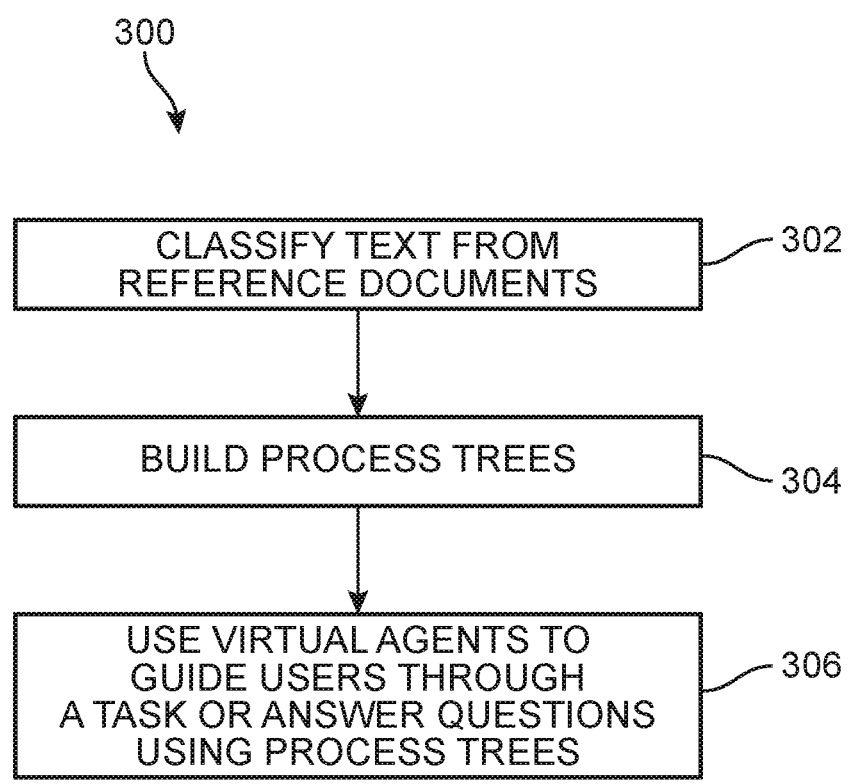
FIG. 3 is a schematic view of a process for using a question and answer system to enable a virtual agent to guide users through a procedure, according to an embodiment.

FIG. 3 is a schematic view of a process 300 for building process trees and using the process trees to facilitate a conversation between a user and a virtual agent. It may be appreciated that one or more of these steps may be performed by an intelligent Q&A system. In particular, some steps may be performed by a process tree generator while some other steps may be performed by a virtual agent.

In step 302, a Q&A system may classify text from one or more reference documents. Specifically, the Q&A system may read text-based data into memory and use a pre-trained classification model to classify portions of the document as procedural or non-procedural. For example, if the reference document is an owner's manual, the classification model may classify a portion of the document including instructions for performing a task as procedural and may also classify a portion of the document including a warranty as non-procedural.

In step 304, the procedural portions of the reference documents may be used to build process trees. In some cases, each different procedural portion may be used to build a different process tree. The trees could be labeled according to their use for later retrieval by a virtual agent or other system. For example, a process tree corresponding to guiding a user through initial setup of a specific device could be labeled with a "Device Setup" tag, so that the process tree is returned anytime the virtual agent requests information about setting up that specific device.

In step 306, one or more virtual agents may use the process trees to guide users through a task, answer related questions, or otherwise help the virtual agent interact in an intelligent manner with a user. Specifically, the virtual agents may traverse paths through the process trees to guide users in performing a task or answering related questions.

Figure 4:
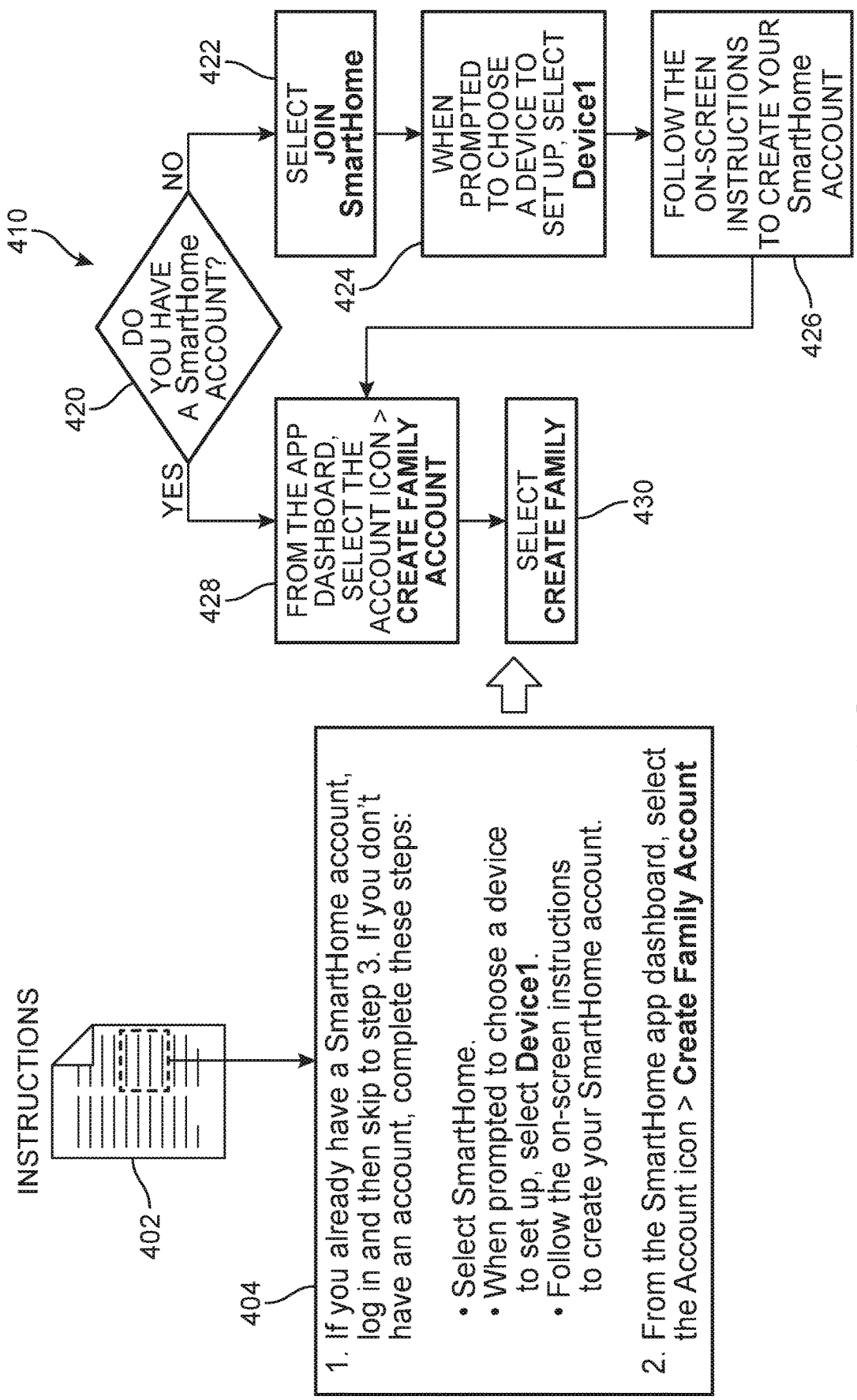
FIG. 4 is a schematic view of a sample portion of procedural text and an associated process tree that has been constructed using the exemplary question and answer system of FIG. 1.

FIG. 4 is a schematic example showing how the exemplary system described in the embodiments can transform written instructions for performing a procedure into a process tree that can be used by a virtual agent to guide a user through the procedure.

In the example of FIG. 4, a Q&A system has identified a portion of procedural text 404 from a document 402. The procedural text 404 includes instructions for connecting a new device ("Device1") to an existing online account (in this case, a "SmartHome" account). For example, the device could be an IoT device that is being registered with a cloud-based account used to control multiple different IoT devices. It may be appreciated that these instructions are only intended as an example.

Procedural text 404 includes instructions with steps labeled as "1." and "2.", and sub-steps indicated using bullet-point characters. Using the exemplary process tree generator (for example, process tree generator 102 of FIG. 1), procedural text 404 can be automatically converted into a process tree 410 that takes the form of a flow-chart. Process tree 410 is comprised of multiple nodes. Each node may be categorized as either a decision node or a response node. Decisions nodes are questions in the process tree which require a response from the user to proceed to one of two (or more) possible response nodes. Response nodes are steps where a user must take some action (such as "Select JOIN SmartHome"). At each decision node, a user may be prompted for an answer. At each response node, a user may be prompted as to whether the issue has been resolved. If the issue is not yet resolved, the system may proceed on to additional response nodes (or steps).

In FIG. 4, process tree 410 includes a decision node 420 (also referred to as a decision point or decision step), as well as multiple response nodes, also referred to as response steps. The response steps include step 422, step 424, step 426, step 428, and step 430. Each of the response steps provide a single instruction or action that the user must complete before proceeding to the next step. By contrast, the decision step indicates a step where a question is asked and a user response to the question is required to proceed. Moreover, it may be seen in FIG. 4 that each step in process tree 410 is connected to at least one adjacent step using directional paths. These directional paths (indicated using arrows) indicate the order in which steps should be performed. In the case of decision nodes, two paths may be indicated as leaving the decision node, in which case the system selects the path corresponding to the "answer" provided by the user to the question associated with the decision point.

It may be appreciated from FIG. 4 that the features of the process tree must be extracted and interpreted from the procedural text. For example, the process tree includes decision node 420 that includes a question ("DO YOU HAVE A SmartHome ACCOUNT?") even though the procedural text does not include any questions. Thus, the exemplary system includes features for identifying decision points and for converting text associated with those decision points into questions that can be posed to the user. Furthermore, the system can generate questions that have binary answers, such as YES/NO or ANSWER1/ANSWER2. This is because asking an open-ended question to a user may result in receiving an answer that is not expected by the system and for which the system cannot select an appropriate path through the process tree.

Figure 5:
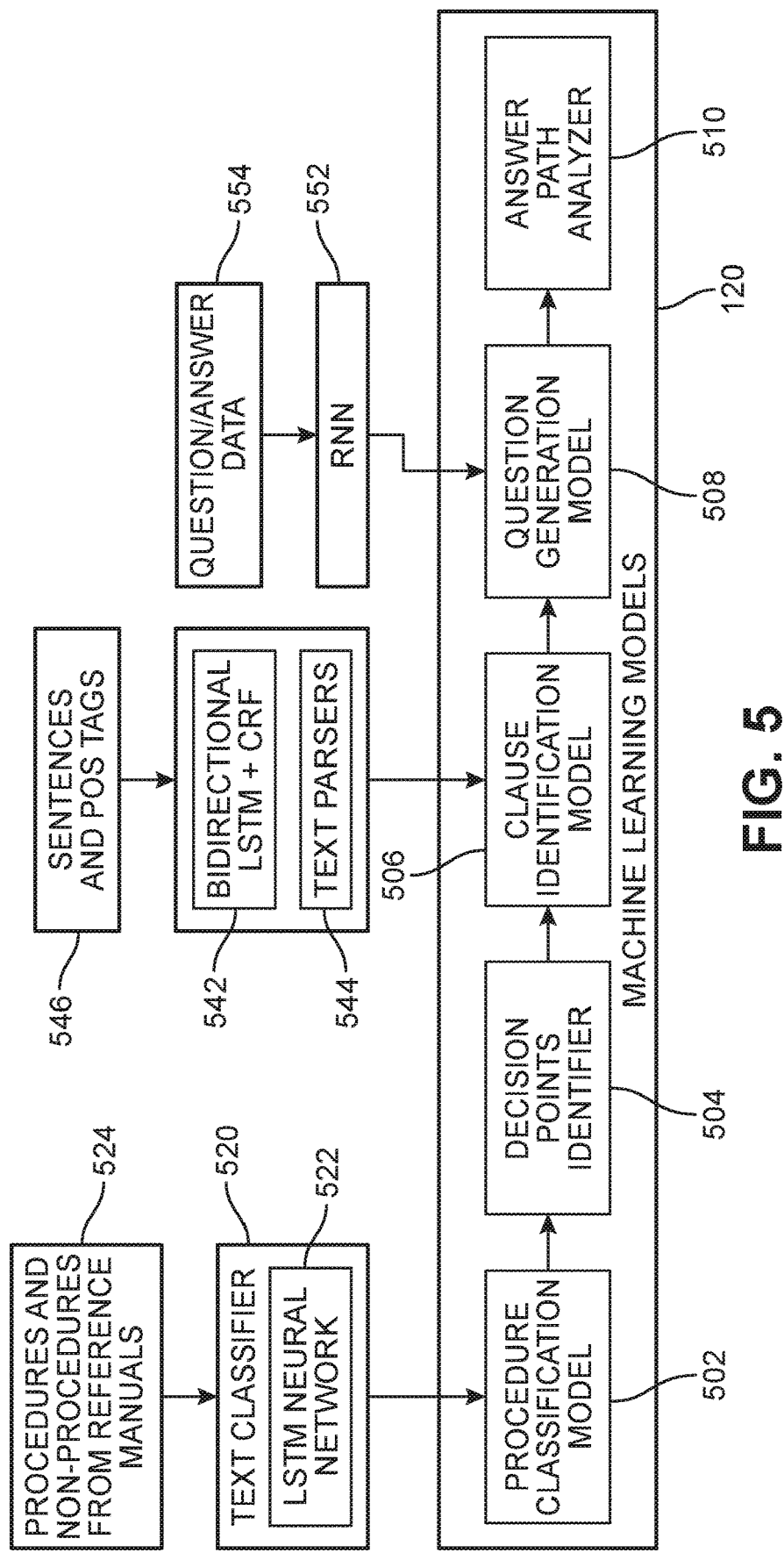
FIG. 5 is a schematic view of a pipeline of models associated with a process tree generator, according to an embodiment.

FIG. 5 is a schematic view showing various machine learning models 120 and other components that are used by the process tree generator for generating process trees. Specifically, the process generator includes a procedure classification model 502, a decision points identifier 504, a clause identification model 506, a question generation model 508, and an answer path analyzer 510.

Procedure classification model 502 can retrieve information from one or more sources (such as reference manuals) and to classify portions of the retrieved information as procedures or non-procedures. Procedures may be characterized by their grammatical content. For example, procedures may often include imperatives (such as "open" or "unplug"), infinitives (such as "to edit"), and gerunds (such as "charging cable"). In the exemplary embodiment, procedure classification model 502 comprises a text classifier 520 that has been pre-trained. More specifically, the text classifier comprises a long-short term memory (LSTM) neural network 522, or simply neural network 522. LSTMs are recurrent neural networks that can learn order dependence in sequence prediction problems. Neural network 522 is trained using a set of reference manuals 524 that include both procedural passages and non-procedural passages. The final trained model is implemented as procedure classification model 502 within the pipeline of machine learning models depicted in FIG. 5.

After training, procedure classification model 502 can be used to both identify and extract procedural text from documents that may comprise a mix of procedural and non-procedural text. It may be appreciated that only the extracted procedural text is analyzed by the remaining components of the process tree generator. Specifically, only text that has been classified as procedural is used as input to decision points identifier 504. Thus, the non-procedural text identified by procedure classification model 502 need not be processed any further.

Decision points identifier 504 uses a Natural Language Processing (NLP) library to parse portions of text that have been classified as procedural by procedure classification model 502. Decision points identifier 504 may include a Parts-Of-Speech (POS) Parser. In one embodiment, decision points identifier 504 may use the open source SpaCy parser which can parse passages of text and provide information about each word, such as part-of-speech. By analyzing the resulting tags applied to the parsed text, decision points identifier 504 can determine which words or phrases correspond with a decision in the procedure.

Clause identification model 506 is used to partition a section of text associated with a decision point into related clauses. Specifically, text associated with a decision point is partitioned into an independent clause and one or more dependent clauses. The independent clauses are associated with a decision point in the process tree, while the dependent clauses are associated with the different outcomes for the decision point.

In the embodiment shown in FIG. 5, clause identification model 506 is constructed using a bi-directional long-short term memory neural network 542. In some cases, LSTM neural network 542 uses a conditional random field (CRF) layer. Clause identification model 506 may also be built using one or more text parsers 544 to identify independent and dependent clauses. Training is performed using sentences and part-of-speech (POS) tags 546.

Figure 6:
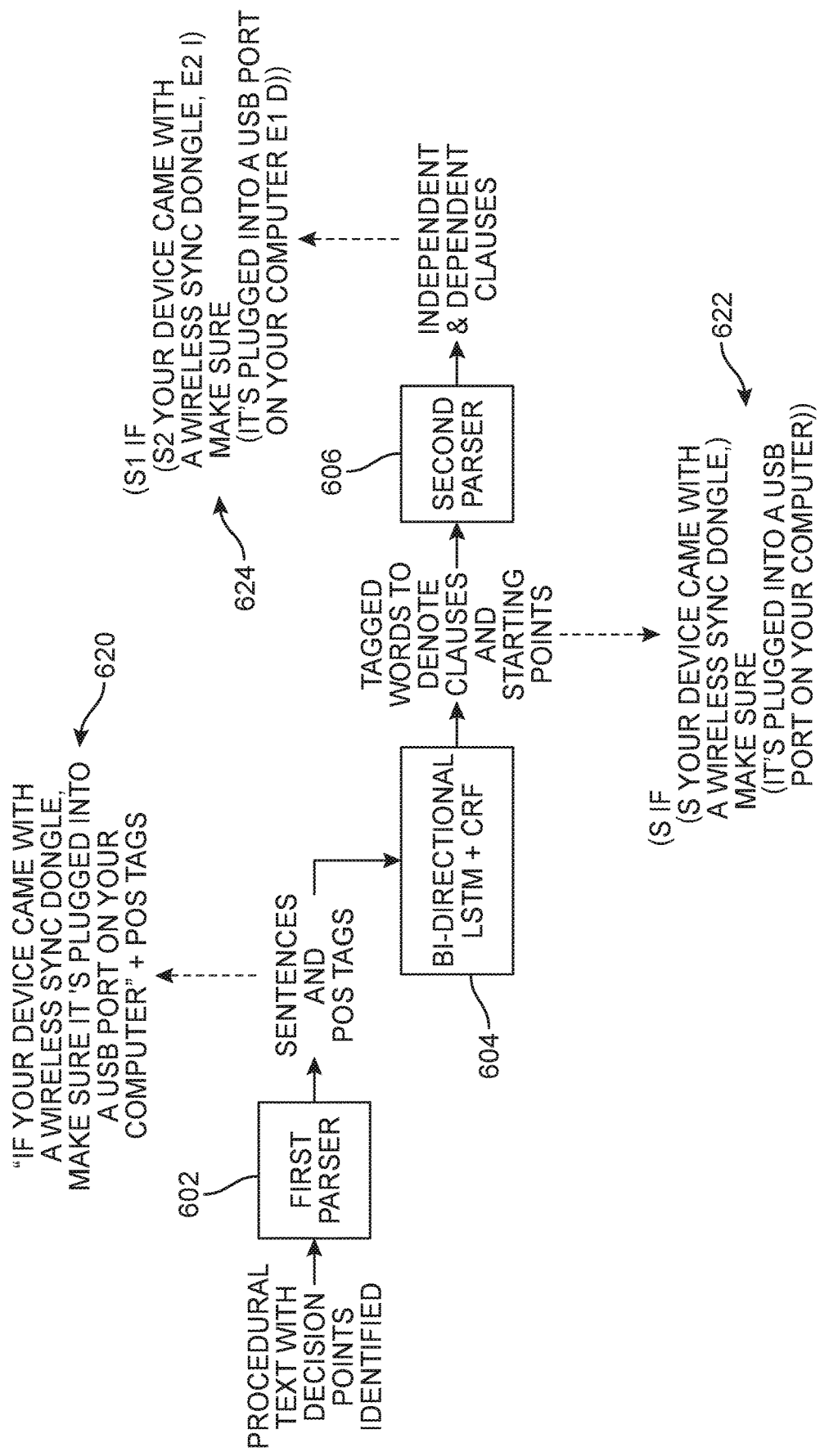
FIG. 6 is a schematic view of various systems used to identify independent and dependent clauses from input text with part-of-speech tags, according to an embodiment.

FIG. 6 is a schematic view showing how an LSTM neural network and parsers are used to convert input text with decision points into independent and dependent clauses. First, procedural text with decision points identified (by decision points identifier 504) are fed into a first parser 602. The first parser 602 outputs sentences from the procedural text as well as parts-of-speech tags for each word. Sentences with POS tags may be fed into a model 604 (for example, a bi-directional LSTM neural network with a conditional random field) whose output is a sequence of tagged words. The tagged words denote both individual clauses in the text, as well as the starting point of each clause. The output of model 604 is fed into a second parser 606, which identifies each clause as either an independent clause or a dependent clause.

FIG. 6 includes a schematic example of text that is parsed according to the process described above. Specifically, FIG. 6 shows an exemplary sentence 620 that has been output by first parser 602. Included in the output is POS tags for each word (if available). This sentence along with the POS tags are fed into model 604. The output of model 604 is provided as a series of clauses 622. Here, each clause is identified by brackets and the start of a new clause is identified by a letter "S". These clauses are then fed into second parser 606, which outputs an updated series of clauses 624. Updated series of clauses 624 includes much of the same information as series of clauses 622, but with additional tags denoting the ending of a clause (indicated by "E1", "E2", for example) and whether each clause is independent (indicated with an "I") or dependent (indicated with a "D").

Using the architecture depicted in FIG. 6, namely a pipeline comprised of a parser, an LTSM model and another parser, allows sentences to be separated into independent and dependent clauses more efficiently than an architecture that uses a single parser. This is because using only a single parser would require the LSTM to be retrained and/or otherwise remodeled for use with a separate training corpus. In some cases, the first parser 604 may be implemented using the open source AllenNLP parser library, while the second parser 606 may be implemented using the open source SpaCy parser library.

Referring back to FIG. 5, once the system has identified independent and dependent clauses, question generation model 508 may be used to generate questions for use in the process tree. Question generation model 508 may include a recurrent neural network (RNN) 552. To train RNN 552, data comprising pairs of questions and answers are used (training data 554).

Figure 7:
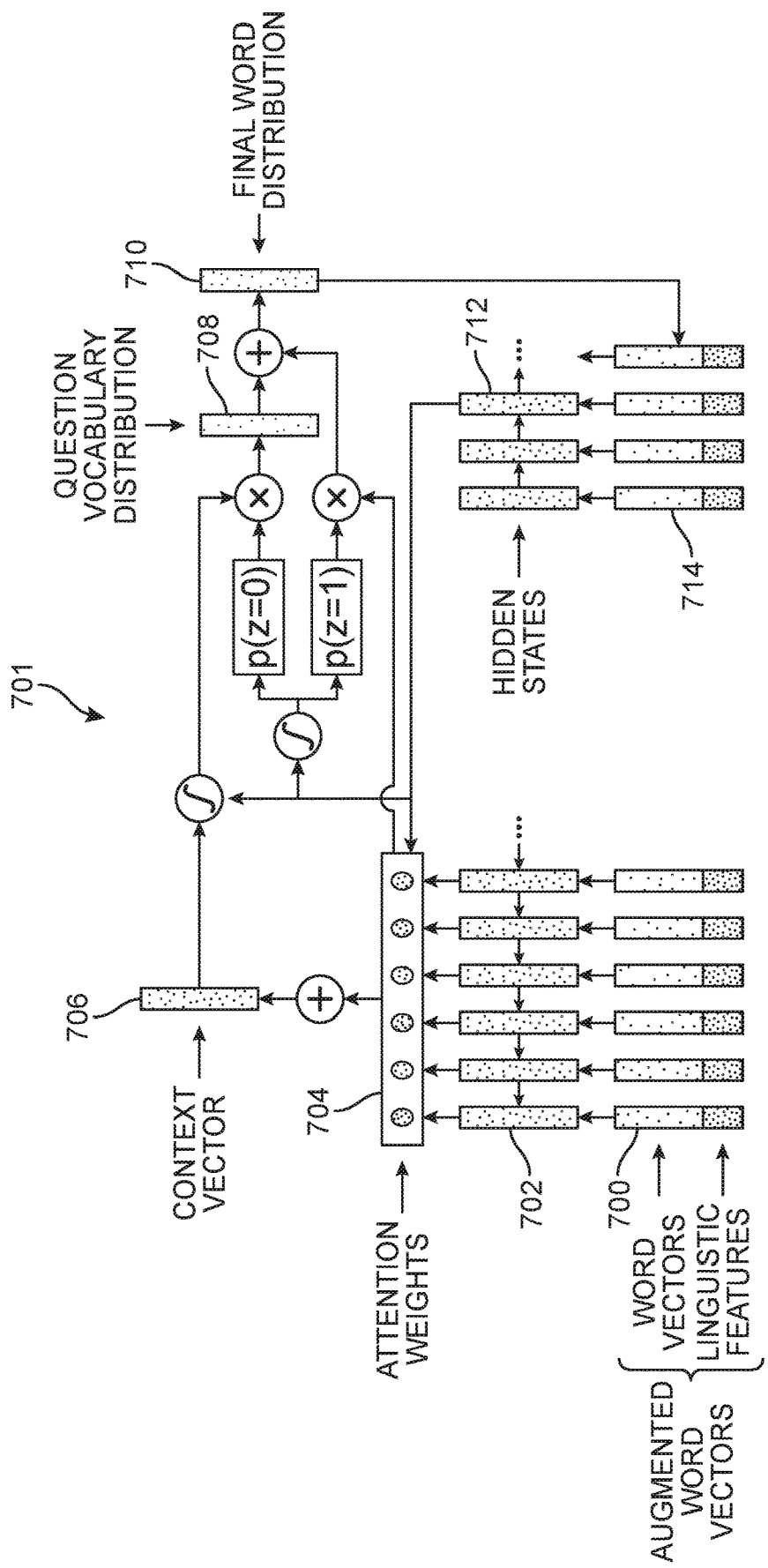
FIG. 7 is a schematic view of a recurrent neural network that is used to generate questions, according to an embodiment.

An exemplary recurrent neural network (RNN) 701 for question generation is depicted schematically in FIG. 7. This network architecture includes input vectors 700, input hidden states 702, attention weights 704, a context vector 706, a question vocabulary distribution 708, a final word distribution 710, output hidden states 712 and output vectors 714. Both the input and output vectors are augmented to include both word vectors and linguistic features. Once trained, RNN 701 outputs sequences of words (at output vector 714) that form a question based on the context of the input words (at input vector 700). For example, if the input sequence of words is "scroll down to see this option if you've already created multiple alarms," the predicted output sequence may be "do you have multiple alarms."

RNN 701 is a data driven model where the answer tokens in a set of question-answer training data are used as input features to the model. This helps in training the model to generate questions with Boolean (that is, two-valued) answers. This constraint is necessary to ensure that question generation model 508 does not generate open-ended questions whose answers could not all be captured in a process tree with binary (such as yes/no or "answer1/answer2") decision points.

In some embodiments, RNN 701 may be trained on standardized question-answer data sets. Because such datasets available in the public domain may include many open-ended questions, the pre-trained model may be further retrained on a subset of question-answer data comprising only Boolean (or Y/N) questions. In some cases, further re-training can be done on domain specific questions that are specific to procedures/complex tasks.

Once the question has been generated using question generation model 508, answer path analyzer 510 is used to generate possible paths that connect the questions to the dependent clauses. In some cases, answer path analyzer 510 may comprise one or more scripts that include rules for connecting questions with two or more dependent clauses. In some cases, answer path analyzer 510 could also generate exits for the process tree wherever there are no further dependencies from a particular step in the process tree.

Figure 8:
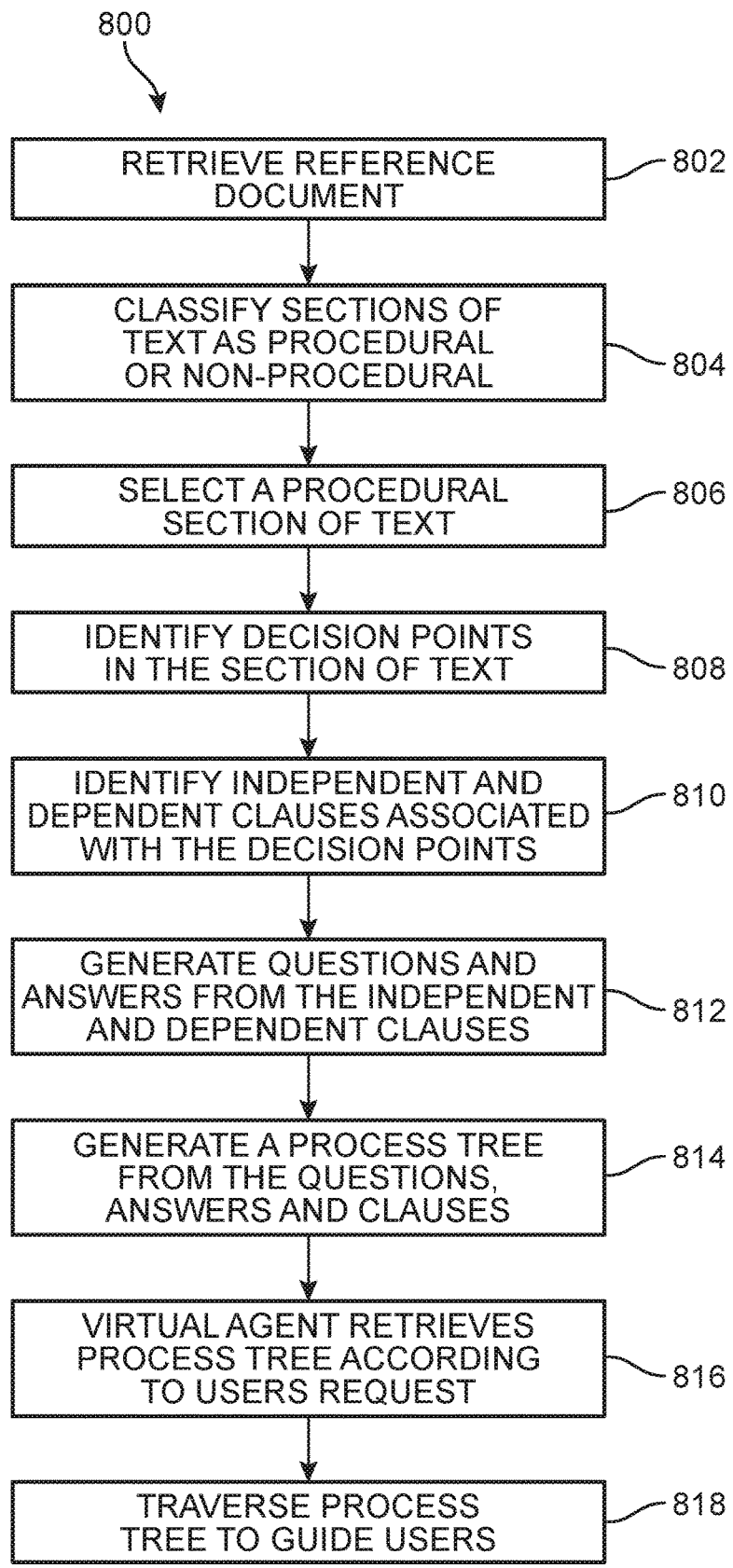
FIG. 8 is a schematic view of a process that may be accomplished by the intelligent question and answer system of FIG. 1, according to an embodiment.

FIG. 8 is a schematic view of the overall process 800 accomplished by an intelligent question and answer system (such as Q&A system 100), according to an embodiment. It may be appreciated that some steps may be accomplished by a process tree generator while other steps may be accomplished by a virtual agent.

Starting in step 802, the system can retrieve a reference document. In some cases, the document can be retrieved by a process tree generator. Next, in step 804, the system can classify sections of the document text as either procedural or non-procedural. As described above, this step could be performed by a procedure classification model (for example, procedure classification model 502 of FIG. 5). Next, in step 806, the system selects a procedural section of the text to be converted into a process tree. In step 808, the system identifies decision points in the selected section of text. This step could be performed by a decision point identifier (for example, decision point identifier 504). Once decision points have been identified, the system can proceed to step 810.

In step 810, the system can identify independent and dependent clauses associated with the decision points. As described above, the system may use a clause identification model (such as clause identification model 506) to analyze input sentences with POS tags that may indicate decision points in the text. Once the independent and dependent clauses associated with a given decision point have been determined, the system may proceed to step 812.

In step 812, the system generates questions and answers from the independent and dependent clauses determined in the previous step. This could be accomplished using a question generation model (for example, question generation model 508). These questions, answers, as well as other steps associated with other dependent clauses previously identified can then be converted into a process tree in step 814.

Once the process tree has been constructed, it may be stored for later use by a virtual agent or other system. In step 816, a virtual agent may retrieve the process tree during (or prior to) a conversation with a user. Specifically, the virtual agent can retrieve a process tree associated with a request from the user. For example, if the user asks for help with setting up a smart device, the virtual agent can search in a database for the appropriate process tree that provides guided instructions for setting up the indicated smart device. In some cases, a pre-trained intent identification model can be used to identify the correct tree for guiding a user based on information received during a conversation with a user. In some cases, the intent identification model could be a random forest classifier.

Finally, in step 818, the virtual agent can use the process tree to guide the user through a procedure. Specifically, the virtual agent can traverse the process tree, asking the user questions at decision points and providing instructions in response to the user's answers to those questions. At each point, the virtual agent encounters either a decision point (that is, an information seeking node) or a response node. At a decision point, the virtual agent asks the user for information regarding the context and/or constraints during the guided task. For example, the virtual agent can ask if the user has a Mac operating system. At each response node, the virtual agent provides advice/commands to a user.

Figure 9:
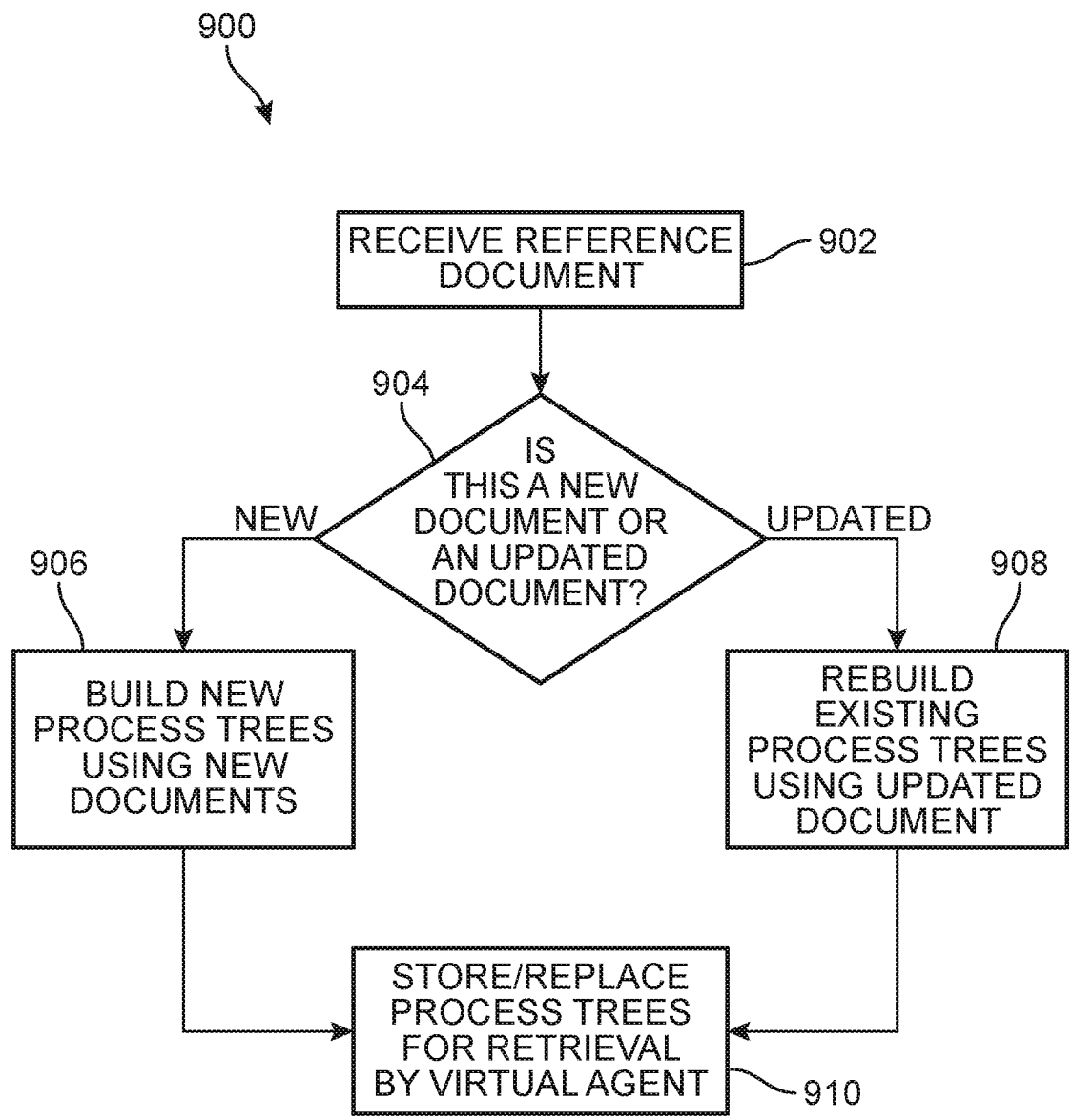
FIG. 9 is a schematic view of a process for re-building process trees as reference documents are updated, according to an embodiment.

The exemplary systems and methods provide improved efficiency for modifying existing process trees that may facilitate guiding users. FIG. 9 is a schematic view of a process for building new process trees and rebuilding existing process trees. Starting in step 902, an intelligent Q&A system may receive a reference document. In step 904, the system determines if the reference document is new or if it is an updated version of an existing document for which a process tree has been previously built. If the document is new, the system proceeds to step 906 to build a new process tree according to the methods described above. If, however, the document is an updated version of an existing document, the system may proceed to step 908.

In step 908, the system automatically rebuilds any process trees associated with procedures detailed in the updated reference document. In particular, the updated document can be passed through the same pipeline of models used to build new process trees. Continuing from either step 906 or step 908, the system can store (if it's a new tree) or replace (of its an existing tree) the process trees for retrieval by a virtual agent.

While various embodiments of the invention have been described, the description is intended to be exemplary, rather than limiting, and it will be apparent to those of ordinary skill in the art that many more embodiments and implementations are possible that are within the scope of the invention. Accordingly, the invention is not to be restricted except in light of the attached claims and their equivalents. Also, various modifications and changes may be made within the scope of the attached claims.

We claim:

1. A method of dynamically generating process trees and using the dynamically generated process trees to converse with a user, wherein conversing with the user is accomplished by an artificially intelligent virtual agent, the method comprising:
retrieving a document including text;
automatically extracting, using a procedure classification model, a section of text in the document corresponding to a procedure;
automatically identifying one or more decision points associated with the section of text;
automatically identifying, using a clause identification model, a set of clauses associated with the one or more decision points, wherein each clause in the set of clauses comprises sequences of words from the section of text;
automatically generating, using a question generation model, at least one question from the set of clauses;
automatically generating a process tree from the at least one question and the set of clauses, wherein the process tree includes:
one or more decision nodes corresponding to the at least one question;
one or more response nodes; and
one or more paths connecting the one or more decision nodes and the one or more response nodes;
retrieving, using the virtual agent, the process tree; and
conversing, using the virtual agent, with the user, wherein conversing with the user includes traversing through at least one path in the process tree.

2. The method according to claim 1, wherein the procedure classification model includes a long-short term memory recurrent neural network and wherein the method further includes training the long-short term memory recurrent neural network using a set of reference manuals.

3. The method according to claim 1, wherein identifying the one or more decision points includes applying a natural language processing parser to the section of text in the document corresponding to the procedure.

4. The method according to claim 1, wherein the clause identification model further includes a long-short term memory recurrent neural network, a first text parser and a second text parser that is different from the first text parser.

5. The method according to claim 4, wherein the long-short term memory recurrent neural network is a bi-directional network and includes a conditional random field layer.

6. The method according to claim 4, wherein the first text parser is used to identify parts-of-speech in sentences, wherein the long-short term memory recurrent neural network is used to generate sequence tags denoting clauses and starting points for the clauses, and wherein the second text parser is used to differentiate between independent clauses and dependent clauses in the clauses identified by the long-short term memory recurrent neural network.

7. The method according to claim 1, wherein the question generation model includes a recurrent neural network and wherein the method further includes training the recurrent neural network with a set of questions and answers.

8. The method according to claim 7, wherein each question in the set of questions and answers is associated with a binary set of answers.

9. The method according to claim 1, wherein at least one of the response nodes in the process tree indicates that the virtual agent should transfer the user to a human agent for further assistance.

10. A system for dynamically generating process trees and using the dynamically generated process trees to converse with a user, the system comprising:
a device processor; and
a non-transitory computer readable medium storing instructions that are executable by the device processor to implement:
a process tree generator that generates process trees, wherein the process tree generator further comprises:
a procedure classification model that classifies sections of text as procedural text or non-procedural text;
a decision points identifier that identifies decision points in procedural text;
a clause identification model that uses information about decision points in procedural text to identify independent and dependent clauses in the procedural text;
a question generation model that generates questions corresponding to independent clauses identified by the clause identification model;
an answer path analyzer that constructs paths between questions generated by the question generation model and dependent clauses identified by the clause identification model;
a virtual agent that retrieves process trees generated by the process tree generator and uses the process trees to converse with users.

11. The system according to claim 10, wherein the procedure classification model includes a long-short term memory recurrent neural network.

12. The system according to claim 10, wherein the decision points identifier includes a natural language processing parser.

13. The system according to claim 10, wherein the clause identification model further includes a long-short term memory recurrent neural network, a first text parser and a second text parser that is different from the first text parser.

14. The system according to claim 13, wherein the long-short term memory recurrent neural network is a bi-directional network and includes a conditional random field layer.

15. The system according to claim 10, wherein the question generation model includes a recurrent neural network.

16. The system according to claim 10, wherein the virtual agent is a chat-bot.

17. A non-transitory computer-readable medium storing software comprising instructions executable by one or more computers which, upon such execution, cause the one or more computers to:
   retrieve a document including text;
   automatically extract a section of text in the document corresponding to a procedure;
   automatically identify one or more decision points associated with the section of text;
   automatically identify a set of clauses associated with the one or more decision points, wherein each clause in the set of clauses comprise sequences of words from the section of text;
   automatically generate at least one question from the set of clauses;
   automatically generate a process tree from the at least one question and the set of clauses.

18. The non-transitory computer-readable medium according to claim 17, wherein the process tree further includes:
   one or more decision nodes corresponding to the at least one question;
   one or more response nodes; and
   one or more paths connecting the one or more decision nodes and the one or more response nodes.

19. The non-transitory computer-readable medium according to claim 17, wherein the document is a reference manual.

20. The non-transitory computer-readable medium according to claim 17, wherein causing the one or more computers to automatically identify a set of clauses includes executing a pre-trained neural network.

\* \* \* \* \*